March 18, 1952  R. E. FRANKS  2,589,793
DEMOUNTABLE PROPELLING UNIT FOR VEHICLES
Filed April 29, 1949  2 SHEETS—SHEET 1
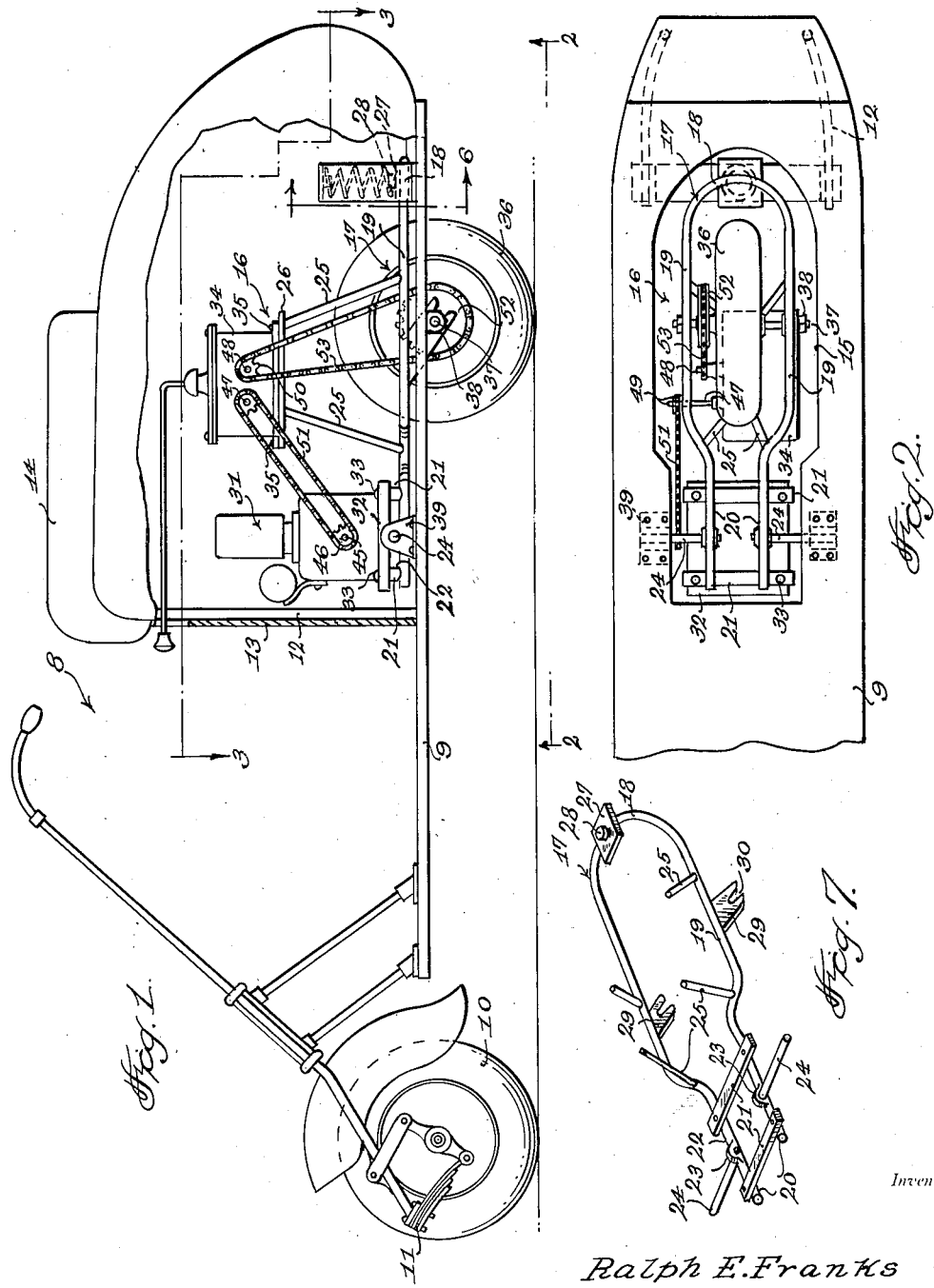
Inventor
Ralph E. Franks
By John N. Randolph
Attorney

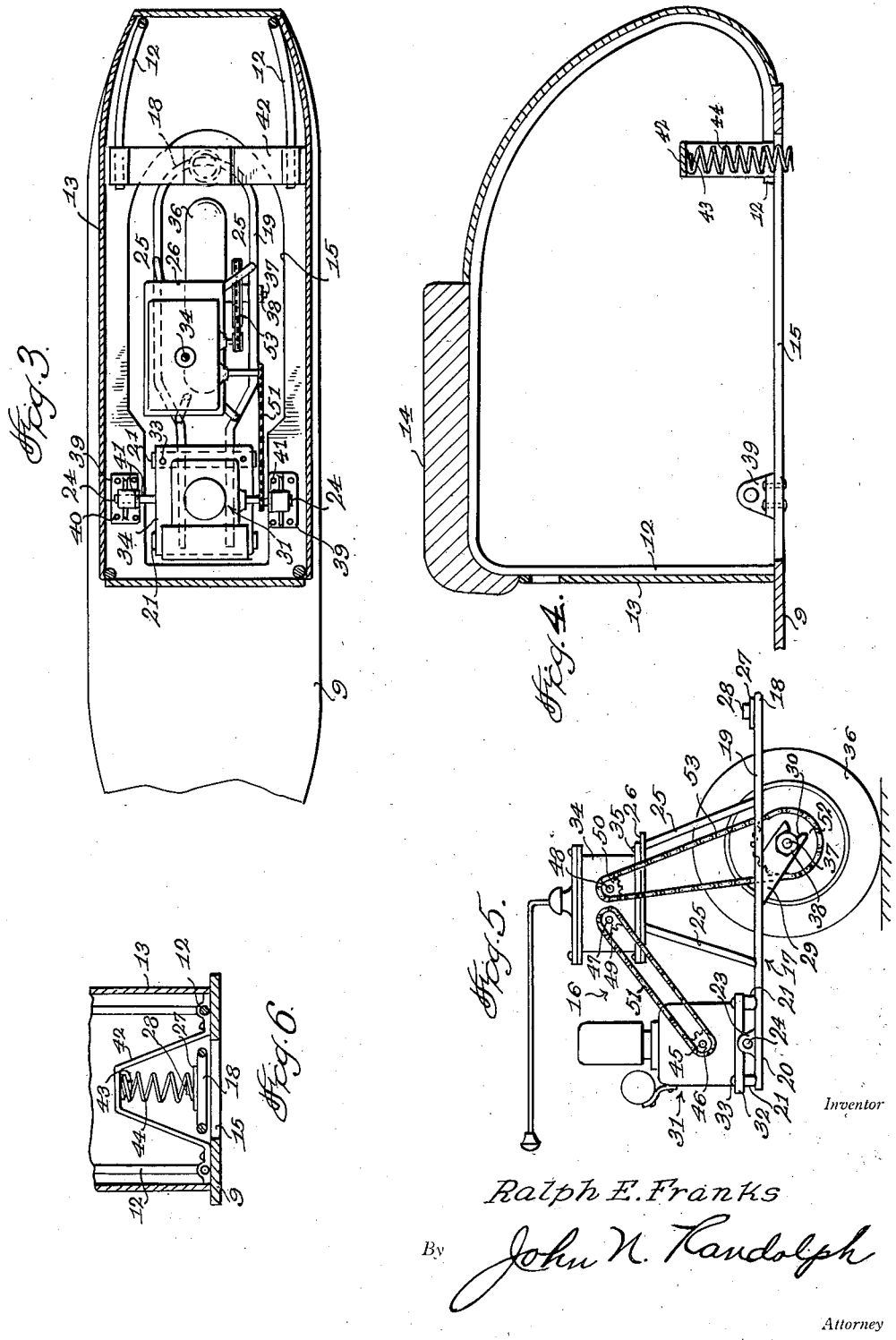

Patented Mar. 18, 1952

2,589,793

UNITED STATES PATENT OFFICE 2,589,793

DEMOUNTABLE PROPELLING UNIT FOR VEHICLES

Ralph E. Franks, Baltimore, Ohio

Application April 29, 1949, Serial No. 90,482

1 Claim. (Cl. 180—32)

1

This invention relates to a novel demountable propelling unit for self propelled vehicles, particularly motor scooters and has for its primary object to provide a unit including a prime mover, transmission and driven ground wheels all attached to a common support which is pivotally and detachably mounted on the vehicle frame and yieldably supported relatively thereto whereby road vibrations of the vehicle will not cause relative movement between the prime mover, transmission and driven ground wheel.

The primary object of the present invention is to provide such a structure which will eliminate the tendency of the chains forming a part of the drive between the prime mover, transmission and driven ground wheel for being tightened and loosened as a result of vibration of the vehicle.

Another important object of the invention is to provide a power unit for motor scooters or similar vehicles which will additionally function to afford a more resilient suspension for the rear end of the vehicle on which is located the rider's seat.

Another object of the invention is to provide a demountable power unit which may be readily removed completely from the vehicle for replacement or repair and which will substantially absorb all vibrations at the rear end of the vehicle.

Various other objects and advantages of the invention will hereinafter become more fully apparent from the following description of the drawings, illustrating a preferred embodiment of the invention and wherein:

Figure 1 is a side elevational view partly in longitudinal section showing the invention in an applied position and forming a part of a motor scooter;

Figure 2 is a bottom plan view thereof taken substantially along a plane as indicated by the line 2—2 of Figure 1;

Figure 3 is a horizontal sectional view taken substantially along a plane as indicated by the line 3—3 of Figure 1;

Figure 4 is a longitudinal, substantially central sectional view in a vertical plane taken through the rear portion of a motor scooter and with the power unit removed therefrom;

Figure 5 is a side elevational view showing the power unit detached;

Figure 6 is a cross sectional view taken substantially along a plane as indicated by the line 6—6 of Figure 1, and Figure 7 is a perspective view of the motor unit frame and with parts thereof broken away.

Referring more specifically to the drawings, the

2 numeral 8 designates generally a motor scooter including a platform 9 which is supported at its forward end by a front steering wheel 10 equipped with a novel resilient suspension unit 11 which is fully illustrated and described in my co-pending application Serial No. 90,481 filed April 29, 1949, which has now matured into Patent No. 2,525,171. A frame 12 is disposed above and supported by the rear portion of the platform 9 and combines with said platform to support and brace the demountable engine hood 13 on the upper forward part of which is mounted the rider's seat 14. The platform 9 is provided with a relatively large longitudinally extending opening 15 having an enlarged rear portion and which is disposed beneath the hood 13.

The demountable power unit, designated generally 16 and comprising the invention, includes an elongated frame, designated generally 17 and best illustrated in Figure 7, composed of a rod which is bent back upon itself to form a rounded rear end 18, corresponding side portions 19 which are spaced relatively far apart and corresponding inwardly offset forward end portions 20 which form the terminals of said rod and inwardly offset forward extensions of the side portions 19. Said forward ends or portions 20 are connected by a pair of transversely disposed bars 21 which are fastened as by soldering or welding, as indicated at 22 to the upper sides of said rod portions 20 for holding said portions in properly spaced relationship. The rod portions 20, between the reinforcing bars 21, are provided with enlargements 23, from each of which projects a stub axle 24. The stub axles 24 project transversely from the frame 17 in opposite directions and are disposed in alignment. The frame 17 also includes a plurality of upwardly converging supporting legs 25 on which a platform 26 is supported and secured substantially parallel to the lower portion of the frame 17, previously described. A plate 27 is secured to the upper side of the rear portion 18 in any suitable manner as by soldering or welding and is provided with an upwardly projecting stud 28, for a purpose which will hereinafter become apparent. The side portions 19 are each provided with a plate 29 which is suitably fixed thereto and which extends downwardly therefrom. The plates 29 are provided with downwardly and rearwardly opening slots or notches 30 which are disposed in transverse alignment for a purpose which will hereinafter be described.

A conventional combustion engine 31 of the type usually employed as the prime mover for motor scooters has a base 32 which rests on the bars 21 and which is detachably fastened thereto by the fastenings 33 which extend through said bars 21. A conventional transmission 34 for the engine 31 is supported on the platform 26 and detachably fastened thereto by the fastenings 35. A conventional rear ground wheel 36 is journaled on an axle 37 the ends of which axle are adjustably disposed in the slots or notches 30 and are threaded to carry clamping nuts 38 for adjustably and detachably securing the axle to the plates 29 for rotatably mounting the wheel 36 in the frame 17.

A pair of bearings 39 is secured to the platform 9 on its upper side and in transverse alignment by fastenings 40 with said bearings 39 disposed on opposite sides of the opening 15 adjacent the forward end thereof. The remote ends of the stub shafts 24 are journaled in the bearings 39 for pivotally supporting the motor unit 16, adjacent its forward end, on the motor scooter 8. The stub shafts 24 carry adjustable collars 41, as seen in Figure 3, to prevent said shafts from sliding in the bearings 39 and which collars 41 are adjusted to bear against the adjacent ends of the bearings.

An arch member 42, which is secured at its ends to the upper side of the platform 9, is disposed over the rear portion of the opening 15 and over the rear frame portion 18 and has a substantially horizontal top portion which is provided with a depending stud 43, as best seen in Figure 6, which is disposed above the stud 28. An expansion coiled spring 44 has its ends mounted on the studs 28 and 43 and with its lower end bearing on the plate 27 and its upper end bearing against the underside of the intermediate portion of the arch 42 to provide a resilient support for the rear part of the motor scooter 8 on the motor unit 16.

As best illustrated in Figure 5, the prime mover 31 is provided with a drive shaft 45 which projects outwardly from one side thereof and to which is fixed a sprocket wheel 46. The transmission 34 is provided with an input shaft 47 and an output shaft 48, which shafts have ends projecting in the same direction from the transmission as said shaft 45 and which transmission shafts carry sprocket wheels 49 and 50, respectively. The drive shaft sprocket wheel 46 is connected to the input shaft sprocket wheel 49 by an endless chain 51. The ground wheel 36 has a sprocket wheel 52 fixed to one side thereof and which is connected by an endless chain 53 to the sprocket wheel of the output shaft 48 for driving said rear wheel 36.

From the foregoing it will be readily apparent that the power unit 16 will function for supporting the rear end of the motor scooter 8 and for providing the propelling force for the motor scooter. The spring 44 will absorb substantially all road shock from the frame 17 and which would otherwise be transmitted to the rear end of the motor scooter frame to provide a resilient or cushion suspension for said portion. The unit 16 will pivot on its stub shafts 24 relatively to the platform 9 to swing vertically with respect to the remainder of the motor scooter in passing over uneven road surfaces and in so doing the transmission and engine will move as a unit with the rear wheel so that there will be no relative movement between said parts and accordingly no tendency for the chains 51 and 53 to be tightened or loosened thereby. By the simple expedient of removing at least one of the bearings 39, the motor unit 16 may be readily removed from the remainder of the motor scooter 8 for replacement or repair.

Various modifications and changes are contemplated and may obviously be resorted to, without departing from the spirit or scope of the invention as hereinafter defined by the appended claim.

I claim as my invention:

A demountable driving unit for motor scooters or the like comprising, in combination with a motor scooter chassis including a platform having an elongated opening extending longitudinally thereof and an arch member rigidly disposed over the rear end of the opening, an elongated frame disposed longitudinally of the chassis and pivotally mounted adjacent its forward end on the chassis above the platform for vertical swinging movement through the platform opening, said frame swinging on its pivot in a vertical plane parallel to the longitudinal axis of the chassis, spring suspension means bearing on the rear end of said frame and beneath said arch member and yieldably supporting the rear portion of the motor scooter chassis relatively to the frame, a driving wheel journaled in said frame between the frame pivot and the spring extension means and adjacent the latter and forming the rear wheel of the motor scooter, a prime mover rigidly supported on the frame and having a driving connection to said driving wheel, said frame being normally disposed above the platform opening and substantially parallel to the platform, the frame and parts supported thereby being sized to pass through the platform opening for applying the driving unit to the chassis and for removing it therefrom, a pair of bearings detachably secured to the platform and rising therefrom, said bearings being disposed one on either side of the platform opening and adjacent the forward end thereof, and trunnions fixed to and projecting laterally from the frame adjacent its forward end and journaled in said bearings.

RALPH E. FRANKS.

REFERENCES CITED

The following references are of record in the file of this patent:

UNITED STATES PATENTS

| Number | Name | Date |
| --- | --- | --- |
| 1,306,995 | Bradshaw | June 17, 1919 |
| 2,243,124 | Rockola | May 27, 1941 |
| 2,275,050 | Lewis | Mar. 3, 1942 |
| 2,455,431 | MacGregor | Dec. 7, 1948 |

FOREIGN PATENTS

| Number | Country | Date |
| --- | --- | --- |
| 425 | Great Britain | 1907 |